(12) United States Patent
Wang et al.

(10) Patent No.: US 9,382,720 B2
(45) Date of Patent: Jul. 5, 2016

(54) CENTRIFUGAL SELF-PRIMING MIXED AND INVERTED-UMBRELLA SHAPED AERATOR

(71) Applicant: HUATIAN ENGINEERING & TECHNOLOGY CORPORATION, MCC, Anhui (CN)

(72) Inventors: Yueping Wang, Anhui (CN); Xinhang Zhang, Anhui (CN)

(73) Assignee: HUATIAN ENGINEERING & TECHNOLOGY CORPORATION, MCC, Anhui (CN)

( * ) Notice: Subject to any disclaimer, the term of this patent is extended or adjusted under 35 U.S.C. 154(b) by 282 days.

(21) Appl. No.: 14/112,359

(22) PCT Filed: Mar. 27, 2013

(86) PCT No.: PCT/CN2013/073243
§ 371 (c)(1),
(2) Date: Oct. 17, 2013

(87) PCT Pub. No.: WO2013/149557
PCT Pub. Date: Oct. 10, 2013

(65) Prior Publication Data
US 2014/0077401 A1    Mar. 20, 2014

(30) Foreign Application Priority Data

Apr. 1, 2012 (CN) .......................... 2012 1 0095371

(51) Int. Cl.
*C02F 3/14* (2006.01)
*E04H 4/12* (2006.01)
(Continued)

(52) U.S. Cl.
CPC ............ *E04H 4/1209* (2013.01); *B01F 3/0478* (2013.01); *C02F 3/16* (2013.01); *Y02W 10/15* (2015.05)

(58) Field of Classification Search
CPC combination set(s) only.
See application file for complete search history.

(56) References Cited

U.S. PATENT DOCUMENTS

| 2,024,986 A | * | 12/1935 | Durdin, Jr. | .............. C02F 3/165 210/173 |
| 3,329,407 A | * | 7/1967 | Clough | ............... B01F 3/04773 261/114.1 |

(Continued)

FOREIGN PATENT DOCUMENTS

| CN | 1657445 A | 8/2005 |
| CN | 1986452 A | 6/2007 |

(Continued)

OTHER PUBLICATIONS

International Search Report from corresponding International Application No. PCT/CN2013/073243, mailed on Jul. 4, 2013.

*Primary Examiner* — Duane Smith
*Assistant Examiner* — Adam W Bergfelder
(74) *Attorney, Agent, or Firm* — Renner, Otto, Boisselle & Sklar LLP.

(57) ABSTRACT

A centrifugal self-priming mixed and inverted-umbrella shaped aerator is disclosed. A plurality of three-phase mixing tube sets is distributed on a surface of a wheel body (1), each of the three-phase mixing tube sets comprises a plurality of three-phase mixing tubes distributed dispersedly on the surface of the wheel body (1), multiple layers of guide cylinders arranged concentrically extend downward from a bottom of the wheel body (1) with a plurality of vertical siphons distributed on an inner wall of each of the layers of guide cylinders, the number of the siphons distributed in each of the layers of guide cylinders is the same as the number of the three-phase mixing tubes of the corresponding three-phase mixing tube set, each of the three-phase mixing tubes has one end attached to an edge of the wheel body (1) and has the other end communicating with the corresponding siphon, and each of the siphons is provided with a negative-pressure suction tube at a joint with the corresponding three-phase mixing tube.

6 Claims, 2 Drawing Sheets

(51) Int. Cl.
   *C02F 3/16*  (2006.01)
   *B01F 3/04*  (2006.01)

(56) References Cited

U.S. PATENT DOCUMENTS

| | | | | |
|---|---|---|---|---|
| 3,576,316 A | * | 4/1971 | Kaelin | B01F 3/0478 210/219 |
| 3,741,682 A | * | 6/1973 | Robertson | B01F 3/0478 261/91 |
| 4,151,231 A | * | 4/1979 | Austin | B01F 3/0478 261/91 |
| 2003/0127754 A1 | * | 7/2003 | Ruzicka | B01F 3/04773 261/93 |
| 2013/0140246 A1 | * | 6/2013 | Fabiyi | C02F 1/727 210/758 |

FOREIGN PATENT DOCUMENTS

| | | |
|---|---|---|
| CN | 101168462 A | 4/2008 |
| CN | 101376539 A | 3/2009 |
| CN | 102730854 A | 10/2012 |
| CN | 202610041 U | 12/2012 |
| JP | 1-104396 A | 4/1989 |

\* cited by examiner

CENTRIFUGAL SELF-PRIMING MIXED AND INVERTED-UMBRELLA SHAPED AERATOR

BACKGROUND OF THE INVENTION

1. Technical Field

The present invention relates to a centrifugal self-priming mixed inverted-umbrella shaped aerator.

2. Description of Related Art

All inverted-umbrella shaped surface aerators in the world have a critical disadvantage: when aerating in a pool having a depth of 4 to 6 meters, only sewage 2 to 3 meters below the water surface can be aerated but deeper sewage is impossible to be aerated and oxygenated, so gases, liquids and solids cannot be mixed sufficiently and effectively, which will increase the energy consumption and costs for sewage treatment.

BRIEF SUMMARY OF THE INVENTION

The present invention provides a centrifugal self-priming inverted-umbrella shaped aerator which is capable not only of improving quality of sewage of every level within a pool, maintaining the water in a up-down circulation state, eliminating oxygenation dead zones in the pool and bringing oxygen in the air into the sewage pool, but also of allowing organics in the sewage to be oxidized effectively while providing aerobic bacteria with living sources.

The present invention proposes a solution of a centrifugal self-priming mixed and inverted-umbrella shaped aerator, which comprises an inverted-umbrella shaped wheel body and blades distributed on the wheel body. A plurality of three-phase mixing tube sets is distributed on a surface of the wheel body. Each of the three-phase mixing tube sets comprises a plurality of three-phase mixing tubes distributed dispersedly on the surface of the wheel body. Multiple layers of guide cylinders arranged concentrically extend downward from a bottom of the wheel body with a plurality of vertical siphons distributed on an inner wall of each of the layers of guide cylinders. Each of the three-phase mixing tube sets corresponds to one of the layers of guide cylinders. The number of the siphons distributed in each of the layers of guide cylinders is the same as the number of the three-phase mixing tubes of the corresponding three-phase mixing tube set. Each of the three-phase mixing tubes has one end attached to an edge of the wheel body and has the other end communicating with the corresponding siphon. Each of the siphons is provided with a negative-pressure suction tube at a joint with the corresponding three-phase mixing tube. One end of the negative-pressure suction tube is directed toward the exterior of the wheel body to communicate with the atmosphere and the other end of the negative-pressure suction tube extends into the three-phase mixing tube in a direction which is the same as an ejecting direction of water flow in the three-phase mixing tube.

A three-phase mixing tube set I, a three-phase mixing tube set II and a three-phase mixing tube set III are distributed on the surface of the wheel body uniformly. The three-phase mixing tube set I, the three-phase mixing tube set II and the three-phase mixing tube set III comprise a plurality of three-phase mixing tubes I, a plurality of three-phase mixing tubes II and a plurality of three-phase mixing tubes III respectively. The three-phase mixing tubes I of the three-phase mixing tube set I, the three-phase mixing tubes II of within the three-phase mixing tube set II and the three-phase mixing tubes III of the three mixing tube set III are distributed on the surface of the wheel body apart from each other. A guide cylinder I, a guide cylinder II and a guide cylinder III are concentrically arranged on the bottom of the wheel body. A tube diameter of the guide cylinder I is wider than a tube diameter of the guide cylinder II, and the tube diameter of the guide cylinder II is wider than a tube diameter of the guide cylinder III. The guide cylinder I, the guide cylinder II and the guide cylinder III extend vertically downward in tube diameter descending order into a step-like arrangement. A plurality of siphons I, a plurality of siphons II and a plurality of siphons III are uniformly distributed on inner walls of the guide cylinder I, the guide cylinder II and the guide cylinder III respectively. Each of the siphons I communicates with one of the three-phase mixing tubes I and is provided with a negative-pressure suction tube I at a joint with the three-phase mixing tube I. Each of the siphons II communicates with one of the three-phase mixing tubes II and is provided with a negative-pressure suction tube II at a joint with the three-phase mixing tube II. Each of the siphons III communicates with one of the three-phase mixing tubes III and is provided with a negative-pressure suction tube III at a joint with the three-phase mixing tube III.

The guide cylinder I, the guide cylinder II and the guide cylinder III extend vertically downward in tube diameter descending order into the step-like arrangement. A section of each of the three-phase mixing tubes I has a rectangular, a circular, a triangle or a polygon shape, a section of each of the three-phase mixing tubes II has a rectangular, a circular, a triangle or a polygon shape, and a section of each of the three-phase mixing tubes III has a rectangular, a circular, a triangle or a polygon shape. A section of each of the siphons I, the siphons II and the siphons III has a rectangular, a circular, a triangle or a polygon shape. The three-phase mixing tube set I, the three-phase mixing tube set II and the three-phase mixing tube set III are distributed on an upper surface or a lower surface of the wheel body.

The present invention provides the following benefits. A plurality of guide cylinders with different lengths is provided on the bottom of the wheel body according to the present invention to extend to different depths in the pool with a plurality of siphons provided in each of the guide cylinders. The upper surface or the lower surface of the wheel body of the aerator has a plurality of three-phase mixing tubes provided thereon. Fluids in the siphons of different depths can be lifted into the gas-liquid-solid three-phase mixing tubes by the centrifugal force generated when the wheel body of the aerator rotates and can be ejected radially and continuously. As long as the wheel rotates, fluids of every level in the pool can be naturally lifted by the centrifugal force to create a continuous up-down circulation and to be ejected radially, so that the fluids of every level can be sufficiently mixed with the air. Each of the siphons is provided with a negative-pressure suction tube at the downstream of the joint with the corresponding three-phase mixing tube. When the fluids are ejected radially by the centrifugal force, a strong negative pressure is necessarily generated in the three-phase mixing tube. Accordingly, the air is sucked in to the three-phase mixing tube by the negative-pressure tube to mix with the solids and liquids in the sewage to create a liquid-solid-gas three-phase mixture which is to be ejected into the pool. In this way, the oxygen contained in the air can oxidize the organics in the sewage effectively while providing aerobic bacteria with living sources.

BRIEF DESCRIPTION OF THE SEVERAL VIEWS OF THE DRAWINGS

The invention as well as a preferred mode of use and advantages thereof will be best understood by referring to the following detailed description of an illustrative embodiment in conjunction with the accompanying drawings, wherein.

Hereinafter, implementations, functional features and advantages of the present invention will be further described with reference to embodiments thereof and the attached drawings.

DETAILED DESCRIPTION OF THE INVENTION

Figure 1:
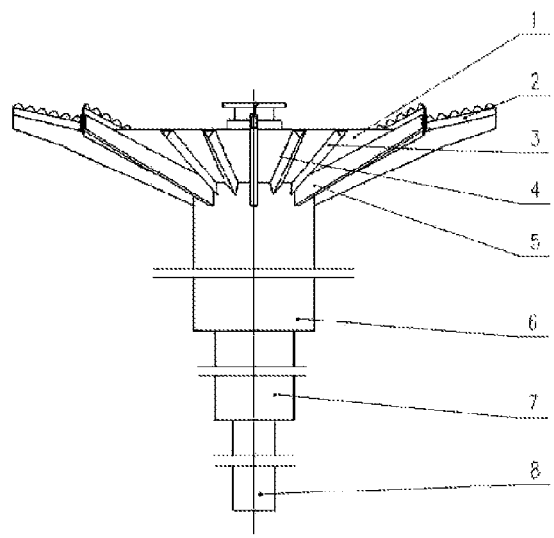
FIG. 1 is a schematic structural view of a first embodiment of the present invention.
Figure 2:
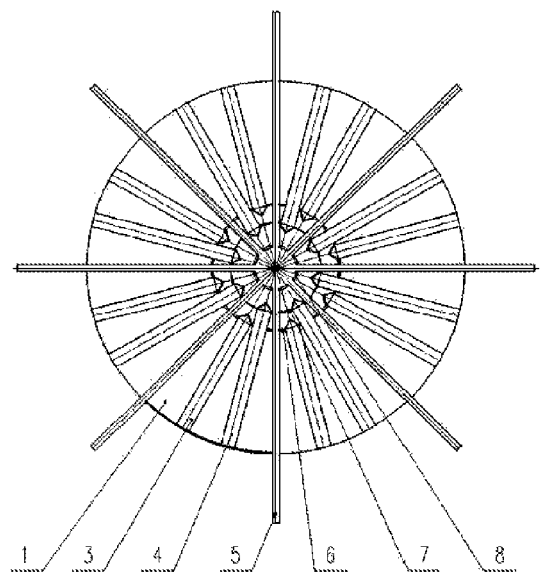
FIG. 2 is a bottom view of FIG. 1.
Figure 3:
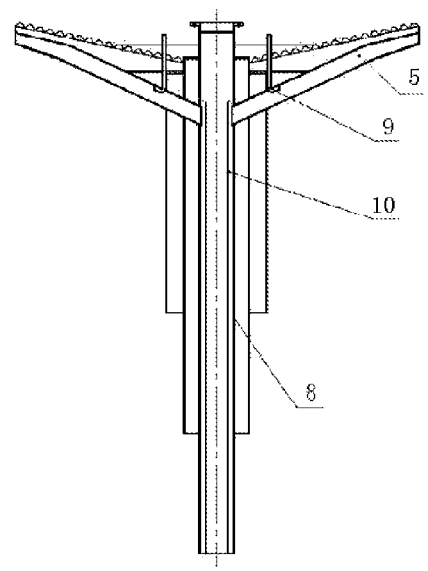
FIG. 3 is a schematic view illustrating how a siphon III connects with a three-phase mixing tube III according to the embodiment of the present invention.
Figure 4:
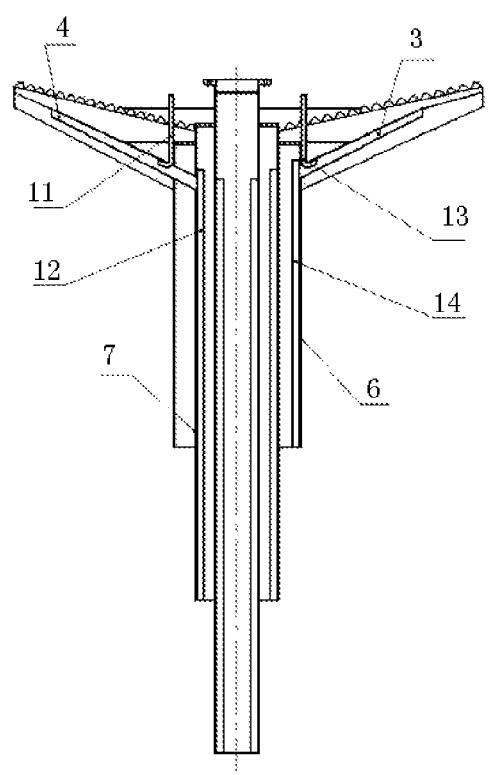
FIG. 4 is a schematic view illustrating how a siphon I connects with a three-phase mixing tube I and how a siphon II connects with a three-phase mixing tube II according to the embodiment of the present invention.

Referring to FIGS. 1 and 2, in a first embodiment, the present invention provides a centrifugal self-priming mixed and inverted-umbrella shaped aerator. The centrifugal self-priming mixed and inverted-umbrella shaped aerator comprises an inverted-umbrella shaped wheel body 1 and blades 2 distributed on the wheel body 1. A three-phase mixing tube set I, a three-phase mixing tube set II and a three-phase mixing tube set III are distributed on a surface of the wheel body 1. The three-phase mixing tube set I, the three-phase mixing tube set II and the three-phase mixing tube set III are distributed on an upper surface or a lower surface of the wheel body 1. The three-phase mixing tube set I, the three-phase mixing tube set II and the three-phase mixing tube set III comprise eight three-phase mixing tubes I 3, eight three-phase mixing tubes II 4 and eight three-phase mixing tubes III 5 respectively. A section of each of the three-phase mixing tubes I 3, the three-phase mixing tubes II 4 and the three-phase mixing tubes III 5 has a rectangular, a circular, a triangle or a polygon shape. The three-phase mixing tubes I 3 of the three-phase mixing tube set I, the three-phase mixing tubes II 4 of the three-phase mixing tube set II and the three-phase mixing tubes III 5 of the three mixing tube set III are distributed dispersedly on the surface of the wheel body 1 apart from each other. A guide cylinder I 6, a guide cylinder II 7 and a guide cylinder III 8 are disposed on the bottom of the wheel body 1. A tube diameter of the guide cylinder I 6 is wider than a tube diameter of the guide cylinder II 7, and the tube diameter of the guide cylinder II 7 is wider than a tube diameter of the guide cylinder III 8. The guide cylinder I 6, the guide cylinder II 7 and the guide cylinder III 8 extend vertically downward in tube diameter descending order into a step-like arrangement. Eight vertical siphons I 14, eight vertical siphons II 12 and eight siphons III 10 are uniformly distributed on inner walls of the guide cylinder I 6, the guide cylinder II 7 and the guide cylinder III 8 respectively. Each of the three-phase mixing tube sets corresponds to one of the layers of guide cylinders, and the number of the siphons distributed in each of the of guide cylinders is the same as the number of the three-phase mixing tubes of the corresponding three-phase mixing tube set. Each of the three-phase mixing tubes I 3, the three-phase mixing tubes II 4 and the three-phase mixing tubes II 5 has one end attached to an edge of the wheel body 1. As shown in FIG. 3, each of the siphons I 14 communicates with one of the three-phase mixing tubes I 3 and is provided with a negative-pressure suction tube I 13 at a joint with the three-phase mixing tube I 3. One end of the negative-pressure suction tube I 13 is directed toward the exterior of the wheel body 1 to communicate with the atmosphere and the other end of the negative-pressure suction tube I 13 extends into the three-phase mixing tube I 3 in a direction which is the same as an ejecting direction of water flow in the three-phase mixing tube I 3. As shown in FIG. 4, each of the siphons II 12 according to this embodiment communicates with one of the three-phase mixing tubes II 4 and is provided with a negative-pressure suction tube II 11 at a joint with the three-phase mixing tube II 4. One end of the negative-pressure suction tube II 11 is directed toward the exterior of the wheel body 1 to communicate with the exterior of the wheel body 1 and the other end of the negative-pressure suction tube II 11 extends into the three-phase mixing tube II 4 in a direction which is the same as an ejecting direction of water flow in the three-phase mixing tube II 4. In FIG. 4, each of the siphons III 10 according to this embodiment communicates with one of the three-phase mixing tubes III 5 and is provided with a negative-pressure suction tube III 9 at a joint with the three-phase mixing tube III 5. One end of the negative-pressure suction tube III 9 is directed toward the exterior of the wheel body 1 to communicate with the exterior of the wheel body 1 and the other end of the negative-pressure suction tube III 9 extends into the three-phase mixing tube III 5 in a direction which is the same as an ejecting direction of water flow in the three-phase mixing tube III 5.

When the inverted-umbrella shaped aerator rotates to operate, sewage of all levels in the pool is lifted into each of the gas-liquid-solid three-phase mixing tubes continuously through the siphons under the centrifugal force and is ejected radially. At this time, a strong negative-pressure is generated in the gas-liquid-solid three-phase mixing tubes and a large amount of air is continuously sucked into the suction tubes provided on the three-phase mixing tubes. The sewage is stirred and collides with the oxygen in the air continuously in the three-phase mixing tubes so that they are sufficiently mixed. The sewage is then ejected radially in forms of water blobs and drops at the distal ends of the three-phase mixing tubes into sufficient contact with the oxygen in the air and finally falls into the pool, thereby accomplishing the transfer of the oxygen. In this way, the quality of sewage of every level in the pool is improved, and the up-down circulation state of the water eliminates oxygenation dead zones in the pool. The oxygen in the air is continuously brought into the sewage pool to effectively oxidize the organics in the pool while providing the aerobic bacteria with living sources.

What described above are only preferred embodiments of the present invention but are not intended to limit the scope of the present invention. Accordingly, any equivalent structural or process flow modifications that are made on basis of the specification and the attached drawings or any direct or indirect applications in other technical fields shall also fall within the scope of the present invention.

The invention claimed is:

1. A centrifugal self-priming mixed and inverted-umbrella shaped aerator, comprising:
    an inverted-umbrella shaped wheel body having blades distributed on the wheel body, and a plurality of three-phase mixing tube sets distributed on a surface of the wheel body, wherein each of the three-phase mixing tube sets comprises a plurality of three-phase mixing tubes distributed dispersedly on the surface of the wheel body; and
    multiple layers of guide cylinders being arranged concentrically and extending downward from a bottom of the wheel body, wherein a plurality of vertical siphons are distributed on an inner wall of each of the layers of guide cylinders;

wherein each of the three-phase mixing tube sets corresponds to one of the layers of guide cylinders, and the number of the siphons distributed in each of the layers of guide cylinders is the same as the number of the three-phase mixing tubes of the corresponding three-phase mixing tube set;

wherein each of the three-phase mixing tubes has one end attached to an edge of the wheel body and has the other end communicating with the corresponding siphon; and wherein each of the siphons is provided with a negative-pressure suction tube at a joint with the corresponding three-phase mixing tube, one end of the negative-pressure suction tube being directed toward the exterior of the wheel body to communicate with the atmosphere and the other end of the negative-pressure suction tube extending into the three-phase mixing tube in a direction which is the same as an ejecting direction of water flow in the three-phase mixing tube.

2. The centrifugal self-priming mixed and inverted-umbrella shaped aerator of claim 1, wherein the plurality of three-phase mixing tube sets includes a first three-phase mixing tube set, a second three-phase mixing tube set, and a third three-phase mixing tube set, which are uniformly distributed on the surface of the wheel body;

wherein the first three-phase mixing tube set comprises a plurality of first mixing tubes, the second three-phase mixing tube set comprises a plurality of second mixing tubes, and the third three-phase mixing tube set comprises a plurality of third mixing tubes, wherein the first mixing tubes, the second mixing tubes, and the third mixing tubes are distributed on the surface of the wheel body apart from each other;

wherein the multiple layers of guide cylinders includes a first guide cylinder, a second guide cylinder, and a third guide cylinder being concentrically arranged on the bottom of the wheel body, wherein a tube diameter of the first guide cylinder is wider than a tube diameter of the second guide cylinder, and the tube diameter of the second guide cylinder is wider than a tube diameter of the third guide cylinder;

wherein the plurality of vertical siphons includes a plurality of first siphons, a plurality of second siphons, and a plurality of third siphons, the respective first siphons, second siphons, and third siphons being uniformly distributed on inner walls of the first guide cylinder, the second guide cylinder, and the third guide cylinder, respectively; and wherein each of the first siphons communicates with one of the first three-phase mixing tubes and is provided with a first negative-pressure suction tube at a joint with the first three-phase mixing tube, each of the second siphons communicates with one of the second three-phase mixing tubes and is provided with a second negative-pressure suction tube at a joint with the second three-phase mixing tube, and each of the third siphons communicates with one of the third three-phase mixing tubes and is provided with a third negative-pressure suction tube at a joint with the third three-phase mixing tube.

3. The centrifugal self-priming mixed and inverted-umbrella shaped aerator of claim 2, wherein the first guide cylinder, the second guide cylinder, and the third guide cylinder extend vertically downward in tube diameter descending order into a step-like arrangement.

4. The centrifugal self-priming mixed and inverted-umbrella shaped aerator of claim 2, wherein a section of each of the first three-phase mixing tubes, the second three-phase mixing tubes, and the third three-phase mixing tubes have a rectangular, circular, triangular, or polygonal shape.

5. The centrifugal self-priming mixed and inverted-umbrella shaped aerator of claim 2, wherein a section of each of the first siphons, the second siphons, and the third siphons have a rectangular, circular, triangular, or polygonal shape.

6. The centrifugal self-priming mixed and inverted-umbrella shaped aerator of claim 2, wherein the first three-phase mixing tube set, the second three-phase mixing tube set, and the third three-phase mixing tube set are distributed on an upper surface or a lower surface of the wheel body.

\* \* \* \* \*